United States Patent
Tatsumi et al.

(10) Patent No.: US 10,589,669 B2
(45) Date of Patent: Mar. 17, 2020

(54) FOLLOWING VEHICLE DETECTION AND ALARM DEVICE

(71) Applicant: Alpine Electronics, Inc., Tokyo (JP)

(72) Inventors: Ryosuke Tatsumi, Iwaki (JP); Kousuke Mitani, Iwaki (JP); Tetsu Kanamori, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 51 days.

(21) Appl. No.: 15/233,430

(22) Filed: Aug. 10, 2016

(65) Prior Publication Data

US 2017/0088050 A1 Mar. 30, 2017

(30) Foreign Application Priority Data

Sep. 24, 2015 (JP) ................................. 2015-186731

(51) Int. Cl.
*B60Q 9/00* (2006.01)
*G06K 9/00* (2006.01)

(52) U.S. Cl.
CPC ........... *B60Q 9/00* (2013.01); *G06K 9/00805* (2013.01)

(58) Field of Classification Search
None
See application file for complete search history.

(56) References Cited

U.S. PATENT DOCUMENTS

| 5,249,157 A * | 9/1993 | Taylor ................... G01S 7/4811 |
| | | 340/435 |
| 5,515,448 A * | 5/1996 | Nishitani ............... B60Q 9/008 |
| | | 340/435 |
| 5,801,667 A * | 9/1998 | Shimizu ................. H04N 7/183 |
| | | 340/435 |

(Continued)

FOREIGN PATENT DOCUMENTS

| CN | 202345573 U | * | 7/2012 |
| JP | 6-325179 A | | 11/1994 |

(Continued)

OTHER PUBLICATIONS

Topendsport.com "Calculating Speed using Video Analysis" Nov. 2010. Accessed at https://web.archive.org/web/20101126101814/http://www.topendsports.com/biomechanics/video-analysis-speed.htm.*

(Continued)

*Primary Examiner* — Jayanti K Patel
*Assistant Examiner* — Stefan Gadomski
(74) *Attorney, Agent, or Firm* — Brinks Gilson & Lione

(57) ABSTRACT

A following vehicle detection and alarm device comprises a tail camera for shooting an area behind a vehicle of interest at a predetermined frame rate, a frame quantity count unit for counting the number of frames after a following vehicle is shot in a shooting range of the tail camera until the following vehicle reaches a first position behind the vehicle of interest, an alarm instruction output unit for outputting an alarm instruction of notifying the driver of the vehicle of (Continued)

interest that the other vehicle is approaching at a timing set based on the number of frames counted by the frame quantity count unit, and an alarm processing unit for performing a predetermined alarm operation on the driver when the alarm instruction is output by the alarm instruction output unit.

7 Claims, 5 Drawing Sheets

(56) References Cited

U.S. PATENT DOCUMENTS

| | | | | |
|---|---|---|---|---|
| 6,097,311 | A * | 8/2000 | Iwasaki | B60Q 9/008 340/903 |
| 6,246,961 | B1 * | 6/2001 | Sasaki | G08G 1/166 701/117 |
| 7,633,383 | B2 * | 12/2009 | Dunsmoir | G06K 9/00805 340/435 |
| 8,040,227 | B2 * | 10/2011 | Friedrichs | G06T 7/223 340/435 |
| 8,189,868 | B2 * | 5/2012 | Aimura | B60R 1/00 348/118 |
| 8,493,198 | B1 * | 7/2013 | Vasquez | B60Q 9/008 340/425.5 |
| 2002/0003378 | A1 * | 1/2002 | Marcus | B60C 23/0401 307/10.1 |
| 2002/0154007 | A1 * | 10/2002 | Yang | B60Q 1/22 340/456 |
| 2003/0097237 | A1 * | 5/2003 | Sekiguchi | G01S 11/12 702/158 |
| 2003/0169902 | A1 * | 9/2003 | Satoh | G06T 1/00 382/104 |
| 2004/0090314 | A1 * | 5/2004 | Iwamoto | B60Q 1/1469 340/425.5 |
| 2004/0183663 | A1 * | 9/2004 | Shimakage | G06K 9/00798 340/436 |
| 2004/0252193 | A1 * | 12/2004 | Higgins | G08G 1/0175 348/149 |
| 2005/0278088 | A1 * | 12/2005 | Thorner | B60Q 9/005 701/28 |
| 2006/0077050 | A1 * | 4/2006 | Takahashi | B60Q 9/008 340/435 |
| 2007/0140527 | A1 * | 6/2007 | Yamamoto | G06K 9/00805 382/104 |
| 2007/0222877 | A1 * | 9/2007 | Kurane | H04N 5/3535 348/294 |
| 2007/0225895 | A1 * | 9/2007 | Ma | G06K 9/00785 701/117 |
| 2008/0166023 | A1 * | 7/2008 | Wang | G08G 1/054 382/107 |
| 2008/0246843 | A1 * | 10/2008 | Nagata | B60R 1/00 348/148 |
| 2008/0304705 | A1 * | 12/2008 | Pomerleau | B60R 1/00 382/103 |
| 2009/0073000 | A1 * | 3/2009 | Chae | G08G 1/167 340/937 |
| 2009/0244263 | A1 * | 10/2009 | Saito | G01C 3/08 348/47 |
| 2010/0260382 | A1 * | 10/2010 | Burtch | B60T 7/22 382/106 |
| 2011/0043633 | A1 * | 2/2011 | Sarioglu | G01S 5/16 348/148 |
| 2011/0150288 | A1 * | 6/2011 | Arimitsu | G01P 3/68 382/107 |
| 2012/0069186 | A1 * | 3/2012 | Ross | B60R 1/00 348/148 |
| 2012/0140072 | A1 | 6/2012 | Murashita et al. | |
| 2012/0194817 | A1 * | 8/2012 | Funayama | G01J 3/027 356/402 |
| 2013/0088343 | A1 * | 4/2013 | Deigmoller | G06T 7/2006 340/436 |
| 2013/0188794 | A1 * | 7/2013 | Kawamata | G01S 3/803 381/56 |
| 2013/0329049 | A1 * | 12/2013 | Haas | B61L 23/042 348/159 |
| 2014/0002657 | A1 * | 1/2014 | Kim | B60Q 9/008 348/148 |
| 2014/0072168 | A1 * | 3/2014 | Wu | G06K 9/00805 382/103 |
| 2014/0085477 | A1 * | 3/2014 | Takano | B60R 25/305 348/148 |
| 2014/0309918 | A1 * | 10/2014 | Rivet | F16P 3/147 701/301 |
| 2014/0350835 | A1 * | 11/2014 | Martin | G08G 9/02 701/301 |
| 2015/0116102 | A1 * | 4/2015 | Takahashi | G08G 1/166 340/435 |
| 2015/0228066 | A1 * | 8/2015 | Farb | G06K 9/00805 348/148 |
| 2015/0329045 | A1 * | 11/2015 | Harris | G06K 9/00805 348/148 |
| 2016/0221494 | A1 * | 8/2016 | Chung | B60Q 9/00 |
| 2016/0307054 | A1 * | 10/2016 | Takemura | G06K 9/00791 |
| 2016/0332516 | A1 * | 11/2016 | Kuehnle | B60K 35/00 |
| 2018/0137760 | A1 * | 5/2018 | Kobayashi | G08G 1/166 |

FOREIGN PATENT DOCUMENTS

| | | |
|---|---|---|
| JP | 2002-321579 | 11/2002 |
| JP | 2002-358507 A | 12/2002 |
| JP | 2003-25937 A | 1/2003 |
| JP | 2012-123470 A | 6/2012 |

OTHER PUBLICATIONS

Delsea 1st Year Physics "Calculating Speed from Video" Nov. 2014. Accessed at https://sites.google.com/site/delseaphysics1/Home/basic-skills/motion-terminology/calculating-speed-from-video.*
Notification of Reasons for Refusal with English Translation for Japanese Patent Application No. 2015-186731 dated Mar. 5, 2019; 10 pages.

* cited by examiner

FOLLOWING VEHICLE DETECTION AND ALARM DEVICE

RELATED APPLICATION

The present application claims priority to Japanese Patent Application Number 2015-186731, filed Sep. 24, 2015, the entirety of which is hereby incorporated by reference.

BACKGROUND

1. Field

The present disclosure relates to a vehicle detection and alarm device that has the function of detecting that a vehicle is approaching from behind a vehicle of interest and preventing a delay during an alarm operation.

2. Description of the Related Art

There is known a vehicle video generation device for calculating an estimated arrival time when a vehicle approaching from behind reaches a vehicle of interest, and when the time is at a predetermined threshold or less, alarming the driver or marking the approaching vehicle on a monitor (see JP 2002-321579 A, for example). Specifically, the vehicle's video generation device determines whether the detected vehicle is approaching based on a speed vector, converting the coordinate of the approaching vehicle into the actual coordinate about the vehicle of interest, calculating a distance between the approaching vehicle and the vehicle of interest and a speed of the approaching vehicle, and calculating an estimated arrival time when the approaching vehicle reaches the vehicle of interest based on the calculated distance and speed.

SUMMARY

The device disclosed in JP 2002-321579 A makes an instruction of issuing an alarm when the estimated arrival time when an approaching vehicle reaches the vehicle of interest is at the predetermined threshold or less, and thus there is a problem that a time for internal processing is required to issue the alarm, and therefore a timing to actually issue the alarm (notification that another vehicle is approaching) is delayed. In particular, the device disclosed in JP 2002-321579 A calculates the estimated arrival time after coordinate conversion and distance/speed calculation, and a time required for complicated calculations is needed, and thus the instruction of issuing the alarm tends to be delayed, which further delays the timing to actually issue the alarm.

There is a configuration, in the above example, such that the alarm is issued when the estimated arrival time is at the predetermined threshold or less, but a similar problem occurs also when the alarm is issued when a vehicle enters within a range of 7 m or less behind the vehicle of interest, for example.

The present disclosure has been made in terms of these points, and it is an object thereof to provide a following vehicle detection and alarm device capable of detecting that a vehicle is approaching from behind a vehicle of interest and preventing a delay during an alarm operation.

In order to solve the above problem, the following vehicle detection and alarm device according to the present disclosure comprises a shooting means for shooting an area behind a vehicle of interest at a predetermined frame rate, a frame quantity count means for counting the number of frames after another vehicle is shot in a shooting range of the shooting means until the other vehicle reaches a first position behind the vehicle of interest, an alarm instruction output means for outputting an alarm instruction of notifying the driver of the vehicle of interest that the other vehicle is approaching at a timing set based on the number of frames counted by the frame quantity count means, and an alarm means for performing a predetermined alarm operation on the driver when the alarm instruction is output by the alarm instruction output means.

A timing to output the alarm instruction based on a result of the counted number of frames including another vehicle is set and its processing contents are simple, thereby being able to prevent a delay when the alarm operation is performed.

It is desirable that the alarm instruction output means sets the timing to be late for more frames and sets the timing to be early for less frames. Thereby, it is possible to easily adjust the timing to actually make the alarm instruction.

It is desirable that the alarm instruction output means sets the timing such that the alarm operation is performed by the alarm means when another vehicle passes a second position closer to the vehicle of interest than the first position. Thereby, it is possible to accurately perform the alarm operation when another vehicle approaches a predetermined position behind the vehicle of interest.

It is desirable that the alarm means outputs a predetermined alarm sound as the alarm operation when another vehicle is traveling in the next lane to the lane in which the vehicle of interest is traveling and the vehicle of interest changes its traveling lane to the next lane. Thereby, it is possible to draw attention to the driver when the other vehicle approaching from behind in the next lane is expected to approach the predetermined position behind the vehicle of interest and the vehicle of interest changes its traveling lane to the next lane.

It is desirable that the alarm means performs predetermined display for notifying that another vehicle is approaching as the alarm operation. Thereby, it is possible to predict when another vehicle approaches from behind the vehicle of interest and reaches the predetermined position and to draw attention to the driver.

It is desirable that a relationship between the number of frames and a timing corresponding to the number of frames is previously stored in the form of table and the alarm instruction output means sets the timing corresponding to the number of frames with reference to the table. Thereby, it is possible to set the timing to make the alarm instruction with a simple processing of only referring to the table.

It is desirable that a relationship between the number of frames and a timing corresponding to the number of frames is previously stored in the form of calculation equation and the alarm instruction output means sets the timing corresponding to the number of frames by use of the calculation equation. Thereby, it is possible to set the timing to make the alarm instruction with a simple processing of only applying the calculation equations.

DETAILED DESCRIPTION

Figure 1:
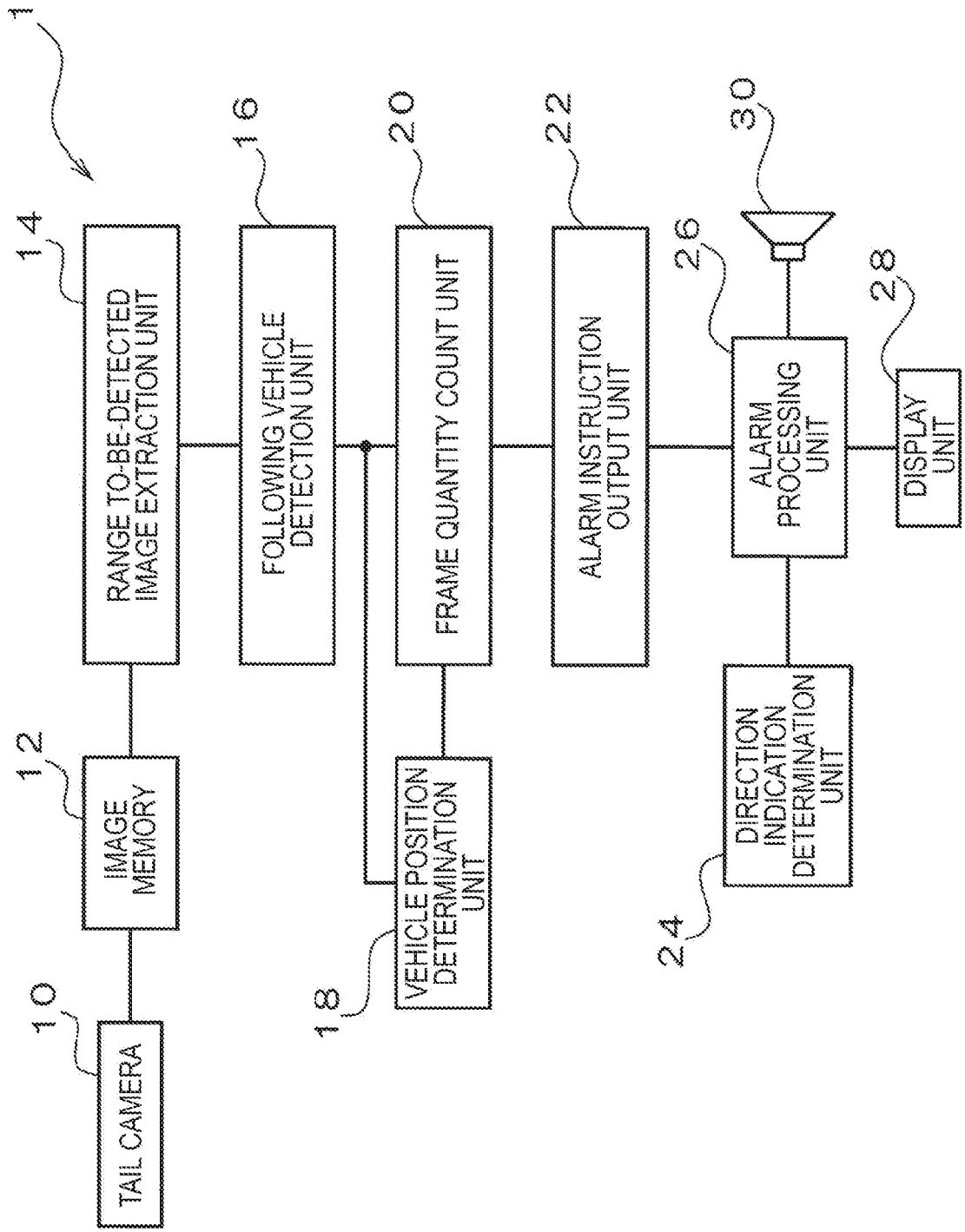
FIG. 1 is a diagram illustrating a structure of a following vehicle detection and alarm device according to one exemplary embodiment.

A following vehicle detection and alarm device according to one exemplary embodiment to which the present disclosure is applied will be described below with reference to the drawings. FIG. 1 is a diagram illustrating a structure of the following vehicle detection and alarm device according to one exemplary embodiment. As illustrated in FIG. 1, the following vehicle detection and alarm device 1 according to the present exemplary embodiment comprises a tail camera 10, an image memory 12, a range to-be-detected image extraction unit 14, a following vehicle detection unit 16, a vehicle position determination unit 18, a frame quantity count unit 20, an alarm instruction output unit 22, a direction indication determination unit 24, an alarm processing unit 26, a display unit 28, and a speaker 30.

The following vehicle detection and alarm device 1 is mounted on a vehicle, and performs a predetermined alarm operation when an approaching vehicle (following vehicle) reaches the rear end of a range to be alarmed (7 m behind the vehicle of interest), wherein a predetermined range (within a range of 3 to 7 m behind the vehicle of interest, for example) at the right and left rear area of the vehicle of interest as a blind area of the driver is set as the range to be alarmed.

The tail camera 10 is attached on the tail of the vehicle, and has a shooting range including the traveling lane of the vehicle of interest and its right and left lanes. For example, it is desirable to employ a CCD shooting device or CMOS shooting device and to further employ a camera with a fisheye lens with a wide angle of view.

Figure 2:
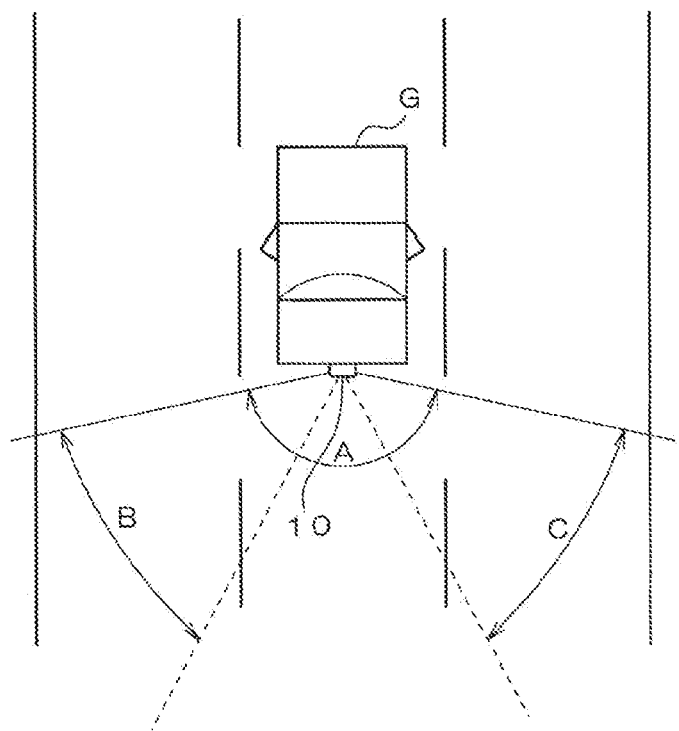
FIG. 2 is a diagram illustrating a tail camera mounting position and a shooting range.
Figure 3:
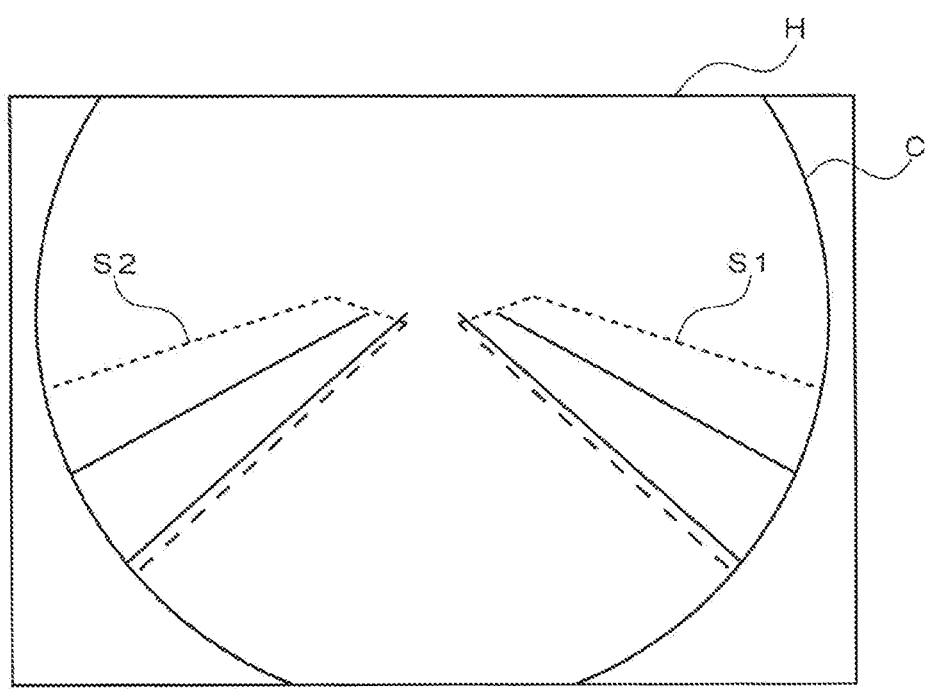
FIG. 3 is a diagram illustrating a relationship between an image shot by the tail camera, and the left part image and the right part image thereof.

FIG. 2 is a diagram illustrating a position where the tail camera 10 is mounted and a shooting range. FIG. 3 is a diagram illustrating a relationship between an image shot by the tail camera 10, and the left part image and the right part image thereof.

As illustrated in FIG. 2, the tail camera 10 is attached on the rear center of a vehicle of interest G, such as above the license plate. The tail camera 10 is set at an angle of view A of around 180 degrees, and is used to shoot the left range to be detected in which an angle range B (<A) is part of the angle of view including the left lane, and is used to shoot the right range to be detected in which an angle range C (=B) is the other part of the angle of view including the right lane. The tail camera 10 is directed for displaying an image behind the vehicle of interest when the vehicle of interest goes in reverse on a display device inside the vehicle interior, and part of the shooting range is assigned to the left range to be detected and the right range to be detected while the vehicle of interest is traveling.

In FIG. 3, the rectangular area H indicates a frame buffer of the tail camera 10, and the partially-missing circular area C indicates an image behind the vehicle of interest shot by the fisheye lens. A range S1 in which the position of a following vehicle, which is traveling in the left lane, is obliquely behind the vehicle of interest, is extracted as the left part image. Similarly, a range S2 in which the position of another vehicle, which is traveling in the right lane, is obliquely behind the vehicle of interest, is extracted as the right part image.

According to the present exemplary embodiment, the left range to be detected and the right range to be detected are shot by use of one tail camera 10, but the left range to be detected may be shot by a left camera mounted on the left side of the vehicle of interest G (below the left door mirror, for example) and the right range to be detected may be shot by a right camera mounted on the right side thereof (below the right door mirror, for example).

The image memory 12 stores the images shot by the tail camera 10 per frame at a predetermined frame rate (such as 30 frames/second).

The range to-be-detected image extraction unit 14 reads an image per frame shot by the tail camera 10 and stored in the image memory 12, and extracts the left part image S1 corresponding to the left range to be detected and the right part image S2 corresponding to the right range to be detected from the image.

The following vehicle detection unit 16 detects a following vehicle shot in the shooting range of the tail camera 10. A following vehicle is detected from the left part image S1 and the right part image S2 included in an image of each frame stored in the image memory 12, respectively. For example, when the characteristics of the front parts corresponding to a plurality of vehicle models are previously extracted and registered, and a partial image having the characteristic is included in an image of each frame, a following vehicle is detected at the position corresponding to the partial image. When a plurality of following vehicles are included in the left part image S1 and the right part image S2, each following vehicle is detected, respectively.

When a following vehicle detected by the following vehicle detection unit 16 is approaching the vehicle of interest, the vehicle position determination unit 18 determines whether the approaching vehicle reaches a position (first position) at a predetermined distance from the vehicle of interest. For example, assuming that a position 10 m behind the vehicle of interest is set as the first position, the vehicle position determination unit 18 determines whether a vehicle approaching from behind reaches 10 m behind the vehicle of interest. Specifically, a virtual line is set at 10 m behind the vehicle of interest within the image, and when part of a following vehicle exceeds the line, it is determined that the following vehicle reaches the line.

The frame quantity count unit 20 counts the number of frames after a following vehicle is shot in the shooting range (the left part image S1 and the right part image S2) of the tail camera 10 until the following vehicle reaches the first position behind the vehicle of interest.

Figures 4A, 4B:
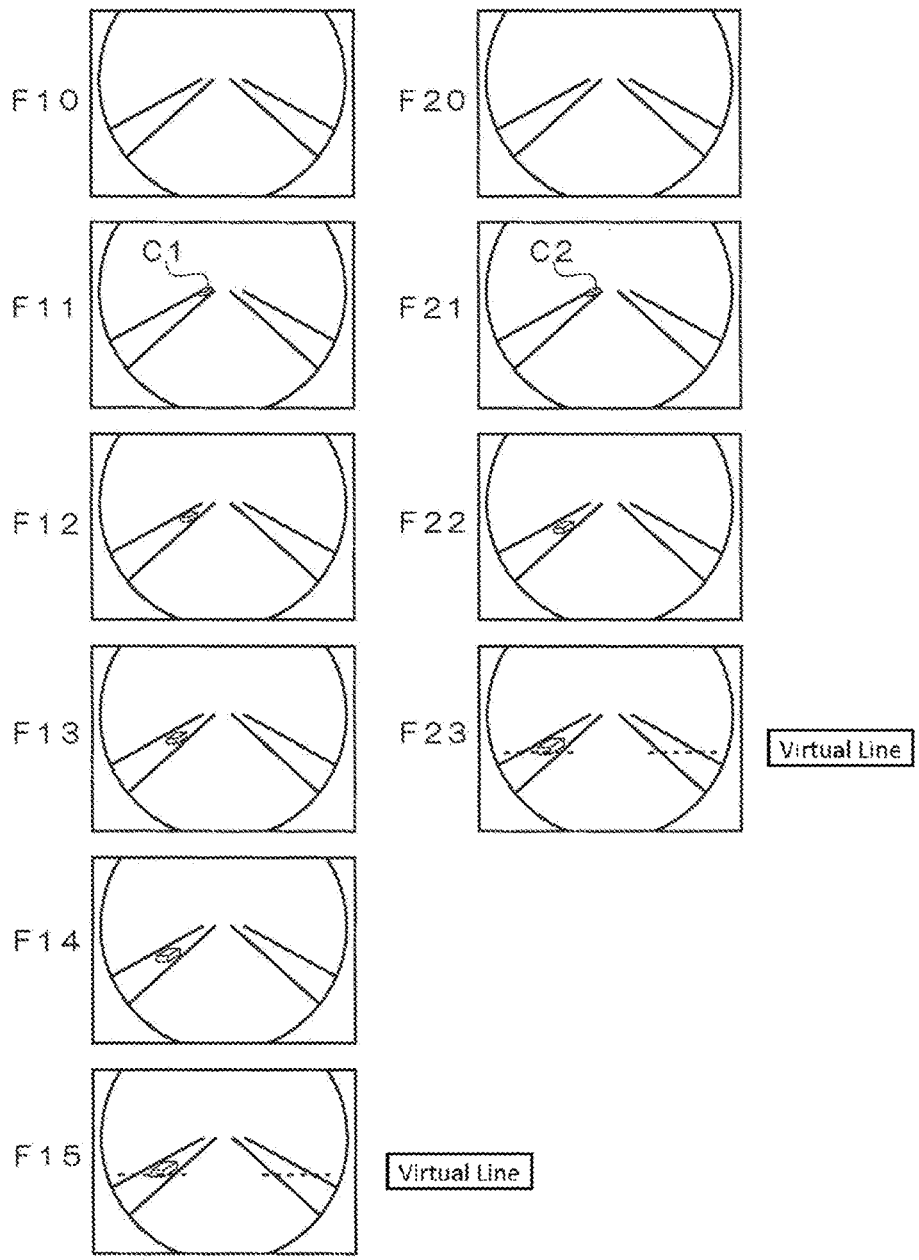
FIG. 4A is a diagram illustrating specific examples of counting the number of frames.
FIG. 4B is a diagram illustrating specific examples of counting the number of frames.

FIGS. 4A and 4B are the diagrams illustrating specific examples of counting the number of frames, wherein FIG. 4A illustrates a case at a low speed of a following vehicle and FIG. 4B illustrates a case at a high speed of a following vehicle.

A Low Speed of Following Vehicle

In FIG. 4A, F10, F11, . . . , F15 indicate consecutive frames shot by the tail camera 10. The image of the frame F10 does not include a following vehicle but the subsequent frame F11 includes a following vehicle C1. For example, when the following vehicle C1 approaches within about 20 m behind the vehicle of interest, the following vehicle is detected by the following vehicle detection unit 16. A detectable position (limit value) of a following vehicle is different depending on a resolution or installation position of the tail camera 10. Each time an image of a new frame is acquired in order of the frames F12, F13, and F14, the position of the following vehicle is closer to the vehicle of interest in this order. The position of the following vehicle reaches 10 m behind the vehicle of interest (the position is indicated in a dotted line) in the image of the frame F15. The frame quantity count unit 20 outputs "5" which is the number of frames including the frames F11, F12, F13, F14, and F15 as the number of frames after the following vehicle is detected until it reaches 10 m behind the vehicle of interest.

A High Speed of Following Vehicle)

In FIG. 4B, F20, F21, F22, and F23 indicate consecutive frames shot by the tail camera 10. The image of the frame F20 does not include a following vehicle but the subsequent frame F21 includes a following vehicle C2. For example, when the following vehicle C2 approaches within about 20 m behind the vehicle of interest, the following vehicle is detected by the following vehicle detection unit 16. Each time an image of a new frame is acquired in order of the frames F22 and F23, the position of the following vehicle is closer to the vehicle of interest in this order. In the image of the frame F23, the position of the following vehicle reaches 10 m behind the vehicle of interest (the position is indicated in a dotted line). The frame quantity count unit 20 outputs "3" which is the number of frames including the frames F21, F22, and F23 as the number of frames after the following vehicle is detected until it reaches 10 m behind the vehicle of interest. The number of frames "3" is lower than the number of frames "5" at a high speed.

The alarm instruction output unit 22 outputs an alarm instruction of notifying the driver of the vehicle of interest that a following vehicle is approaching at a timing set based on the number of frames counted by the frame quantity count unit 20. Specifically, the alarm instruction output unit 22 sets a timing to output the alarm instruction such that the predetermined alarm operation is performed by the alarm processing unit 26 when an approaching following vehicle passes a second position (7 m behind the vehicle of interest, for example) closer to the vehicle of interest than the first position (10 m behind the vehicle of interest). For example, the alarm instruction output unit 22 sets the timing to output the alarm instruction to be late for more frames (at a low speed of a following vehicle), and sets the timing to output the alarm instruction to be early for less frames (at a high speed of a following vehicle).

Since a certain time for internal processing is required until the alarm operation is started after the alarm instruction is output, the alarm instruction is made at a late timing at a low speed of a following vehicle and the alarm instruction is made at an early timing at a high speed of a following vehicle, thereby being able to start the alarm operation irrespective of a speed at the position 7 m behind the vehicle of interest.

The examples illustrated in FIGS. 4A and 4B assume the number of counts "5" at a low speed and the number of counts "3" at a high speed for easy understanding, but when an image is shot at 30 frames per second, the number of frames actually shot from 20 m behind the vehicle of interest to 10 m behind the vehicle of interest is larger than these values.

Figure 5:
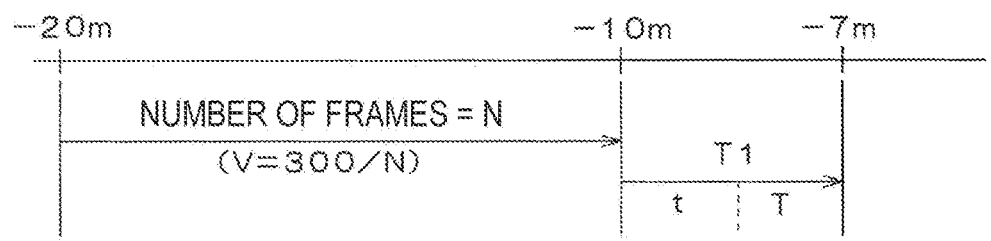
FIG. 5 is a diagram illustrating an alarm instruction output timing setting method by an alarm instruction output unit.

FIG. 5 is a diagram illustrating an alarm instruction output timing setting method by the alarm instruction output unit 22. The number of frames after a following vehicle starts to be detected (after it passes 20 m behind the vehicle of interest) until it reaches 10 m behind the vehicle of interest is assumed as N. Assuming a time required to actually perform the alarm operation after the alarm instruction is output by the alarm instruction output unit 22 as T, there will be considered a case in which the alarm operation is started at a timing when a following vehicle passes 7 m behind the vehicle of interest.

Assuming that the images at 30 frames per second are shot by the tail camera 10, a time T0 required for traveling 10 m between 20 m behind the vehicle of interest and 10 m behind the vehicle of interest is assumed as:

$$T0 = N/30 \text{ (sec)}$$

Therefore, a speed V of the following vehicle is assumed as:

$$V = 10/T0 = 10/(N/30)) = 300/N \text{(m/sec)}$$

A time T1 required for traveling 3 m between 10 m behind the vehicle of interest and 7 m behind the vehicle of interest is assumed as:

$$T1 = 3/V = 3 1 (300/N) = N/100$$

When the alarm is to be issued 7 m behind the vehicle of interest, the time T after the alarm instruction is output by the alarm instruction output unit 22 until the alarm is actually issued needs to be considered, and thus assuming that the alarm instruction is output t seconds after the following vehicle reaches 10 m behind the vehicle of interest, the following equation is established:

$$t = T1 - T = N/100 - T$$

T is a predetermined value (fixed value) in the right side of the relational equation, and thus if N, which is the number of frames counted by the frame quantity count unit 20, can be acquired, the timing t to output the alarm instruction can be acquired. The alarm instruction output unit 22 stores the relational equation therein and uses it to make a simple calculation, thereby being able to find the timing t without a delay and a complicated calculation.

The relationship between N and t is held in the form of table (for example, may be assumed to be held in the alarm instruction output unit 22 or an external memory (not illustrated)), and thus the alarm instruction output unit 22 may acquire the timing t corresponding to the count value N with reference to the table without any calculation.

The direction indication determination unit 24 determines an operation state of the direction indicator (blinker) of the vehicle of interest (whether the direction indicator is operating), and a direction (right/left) indicated during the operation. The determination result is sent to the alarm processing unit 26.

When the alarm instruction is output by the alarm instruction output unit 22, the alarm processing unit 26 performs the predetermined alarm operation on the driver. Specifically, the alarm processing unit 26 uses the display unit 28 to perform predetermined display for notifying that a following vehicle is approaching. For example, the display unit 28 may be provided in front of the driver's seat or may be attached by use of part of the right or left door mirror. The alarm processing unit 26 outputs a predetermined alarm sound from the speaker 30 when a following vehicle is traveling in the next lane to the lane in which the vehicle of interest is traveling and the vehicle of interest changes its traveling lane to the next lane (when the direction indication determination unit 24 determines that the direction indicator is operating toward the next lane in which the following vehicle is traveling). The alarm may be issued in another method such as vibrating the steering wheel or seat instead of issuing the alarm via display or sound or in combination therewith.

The tail camera 10 corresponds to a shooting means, the frame quantity count unit 20 corresponds to a frame quantity count means, the alarm instruction output unit 22 corresponds to an alarm instruction output means, and the alarm processing unit 26, the direction indication determination unit 24, the display unit 28, and the speaker 30 correspond to an alarm means.

The following vehicle detection and alarm device 1 according to the present exemplary embodiment is configured as described above, and the operations thereof will be described below.

Figure 6:
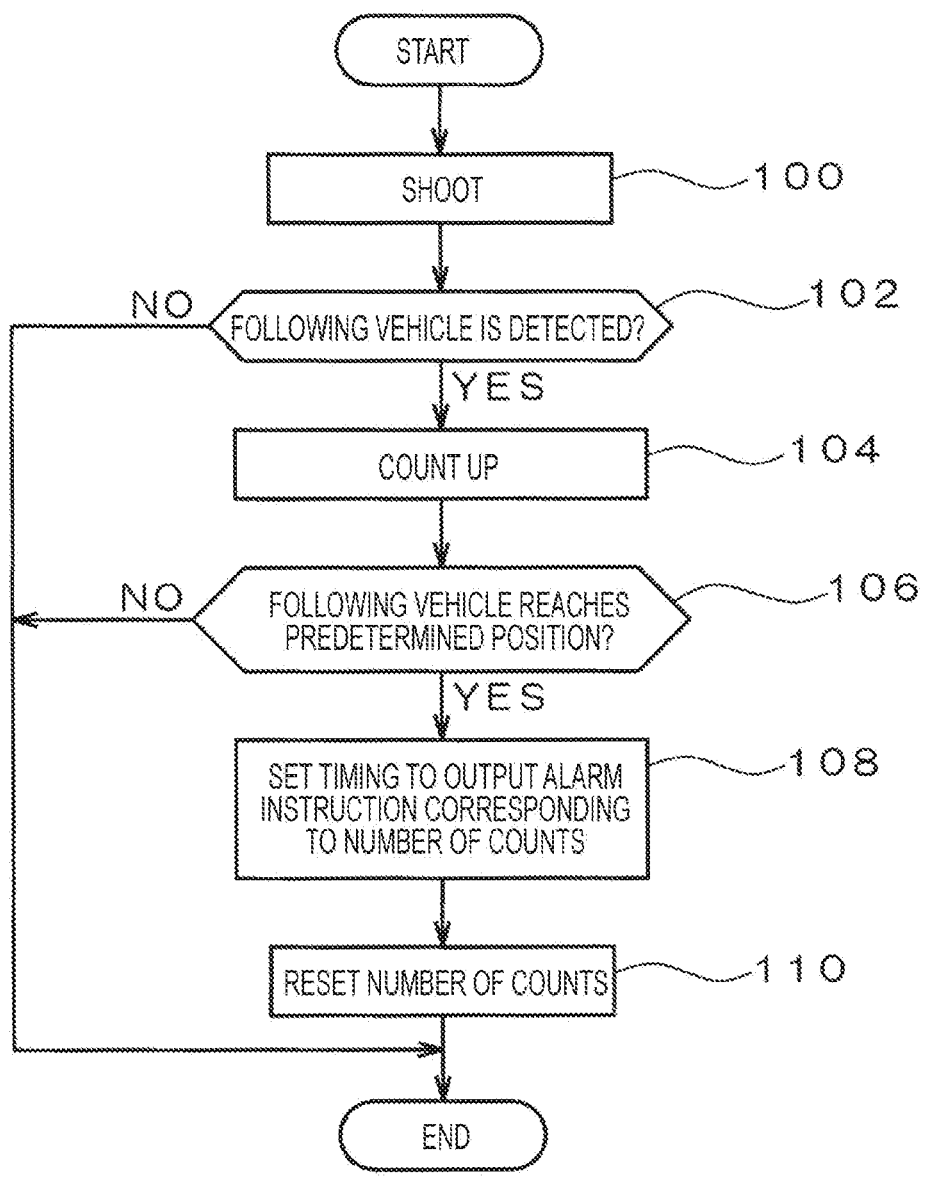
FIG. 6 is a flowchart illustrating an operation procedure of shooting an area behind a vehicle of interest by the tail camera and counting the number of frames including a following vehicle.

FIG. 6 is a flowchart illustrating an operation procedure of shooting an area behind the vehicle of interest by the tail camera 10 and counting the number of frames including a following vehicle. A series of operations illustrated in FIG. 6 is repeatedly performed each time an image per frame is shot.

One frame of an area behind the vehicle of interest is shot by the tail camera 10 (step 100). The acquired image is stored in the image memory 12. After the left part image S1 and the right part image S2 are extracted from the image by the range to-be-detected image extraction unit 14, the following vehicle detection unit 16 determines whether a following vehicle is included in the left part image S1 and the right part image S2 (step 102). When no following vehicle is included in the images, the determination is made to be NO, and the series of operations for the frame image is terminated. When at least one following vehicle is included in the images, the determination in step 102 is made to be YES. The frame quantity count unit 20 then counts up the number of frames (increments the number of counts by 1) for the detected following vehicle (step 104). When a plurality of following vehicles are detected, the count operation is performed on each following vehicle, respectively.

The vehicle position determination unit 18 then determines whether the following vehicle reaches the predetermined position (10 m behind the vehicle of interest) (step 106). When the following vehicle does not reach the position (if a plurality of following vehicles are present, when all the following vehicles do not reach the position), the determination is made to be NO, and the series of operations for the frame image is terminated. When at least one following vehicle approaches from behind and reaches the predetermined position, the determination is made to be YES in step 106. The alarm instruction output unit 22 then sets the alarm instruction output timing corresponding to the count value acquired in step 104 for the following vehicle reaching the predetermined position (step 108).

Thereafter, the frame quantity count unit 20 resets the number of counts corresponding to the following vehicles to be set with the alarm instruction output timing to zero (step 110). When a plurality of following vehicles reach the predetermined position at the same time (for example, when two following vehicles, which are traveling in the right and left lanes, respectively, reach the predetermined position at the same time), the operations in steps 108 and 110 are performed for the following vehicles in parallel. In this way, the series of operations for the frame image is terminated.

Figure 7:
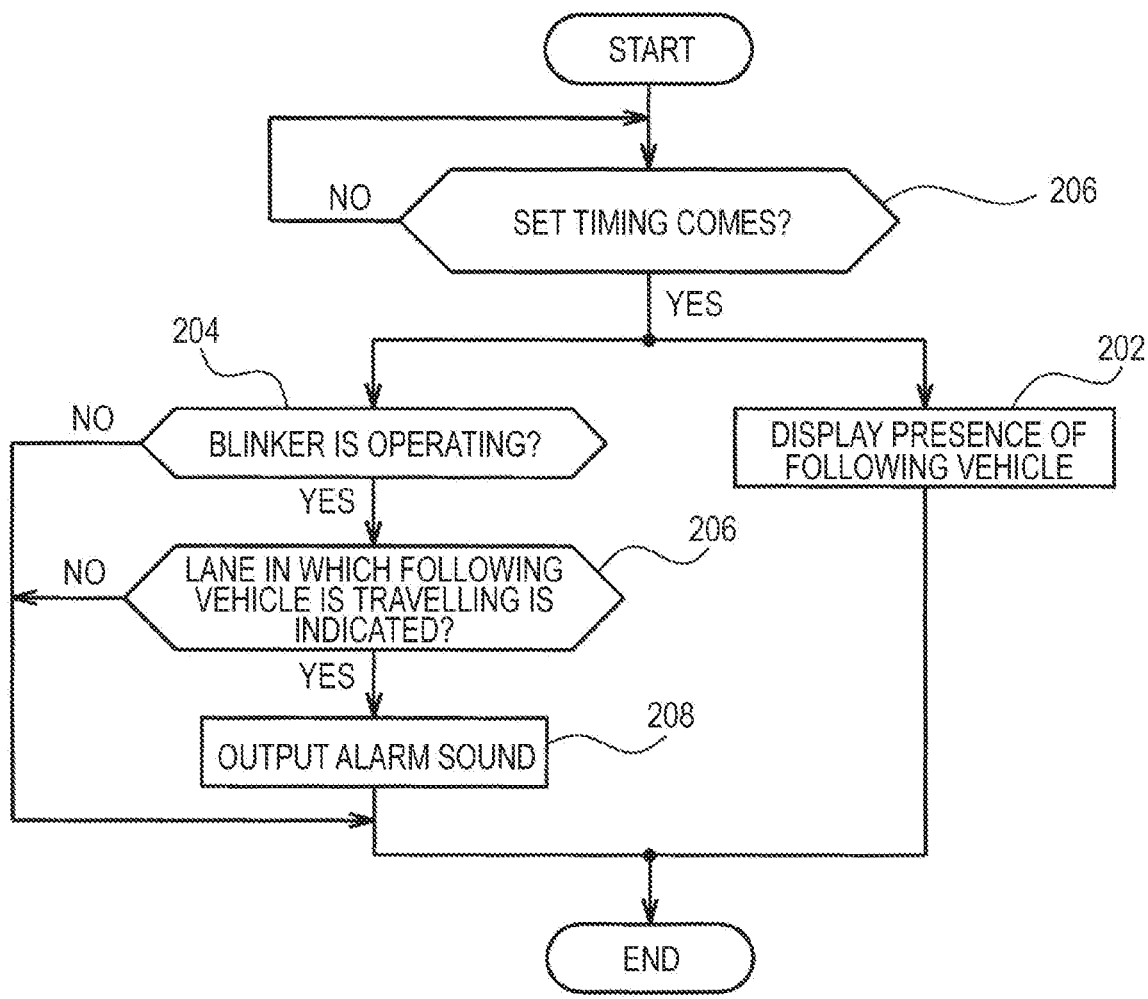
FIG. 7 is a flowchart illustrating an operation procedure of alarming the driver when a following vehicle is approaching.

FIG. 7 is a flowchart illustrating an operation procedure of alarming the driver when a following vehicle is approaching.

The alarm processing unit 26 determines whether the alarm instruction output timing set by the alarm instruction output unit 22 comes (step 200). When an alarm instruction output timing is not set or when it is set but does not come, the determination is made to be NO, and the determination is repeatedly made. When the alarm instruction output timing comes, the determination in step 200 is made to be YES. In this case, the alarm operation of notifying that a following vehicle is approaching and the alarm operation of outputting an alarm sound under a predetermined condition and notification of the fact are performed in parallel.

Alarm Operation by Display

When the alarm instruction output timing comes, the alarm processing unit 26 uses the display unit 28 to perform predetermined display for notifying that a following vehicle is approaching (step 202).

When a time after the alarm instruction is output by the alarm instruction output unit 22 until the alarm sound is output (step 208) is different from a time until predetermined display is performed (step 202), it is desirable that the timing is set by giving priority to the alarm sound output. In such a case, a timing to output the alarm instruction for alarm sound output and a timing to output the alarm instruction for display may be separately set.

In this way, the following vehicle detection and alarm device 1 according to the present exemplary embodiment sets the timing to output the alarm instruction based on a result of the counted number of frames including a following vehicle from among the images of the frames acquired by the tail camera 10, the processing contents of which are simple, thereby preventing a delay in issuing the alarm. In particular, the output timing is set to be late for more counted frames and the output timing is set to be early for less frames, thereby easily adjusting the timing to actually make the alarm instruction.

The alarm instruction output timing is set such that the alarm operation is performed when another vehicle passes the second position closer to the vehicle of interest than the first position where the number of frames is completely counted, thereby being able to accurately perform the alarm operation when the following vehicle approaches the predetermined position (the second position) behind the vehicle of interest.

When another vehicle is traveling in the next lane to the lane in which the vehicle of interest is traveling and the vehicle of interest changes its traveling lane to the next lane, the predetermined alarm sound is output as the alarm operation thereby being able to draw attention to the driver when the vehicle of interest changes its traveling lane to the next lane.

The predetermined display for notifying that a following vehicle is approaching is performed as the alarm operation, thereby predicting when the following vehicle approaches from behind the vehicle of interest and reaches the predetermined position, and drawing attention to the driver.

By use of the table indicating the relationship between the counted number of frames and the alarm instruction output timing corresponding to the number of frames, the timing to make the alarm instruction can be set by the simple processing of only referring to the table. Alternatively, by use of the calculation equation indicating the relationship between the counted number of frames and the alarm instruction output timing corresponding to the number of frames, the timing to make the alarm instruction can be set by the simple processing of only applying the equation.

The present disclosure is not limited to the above exemplary embodiment, and variations are possible within the scope of the present disclosure. For example, the above exemplary embodiment is configured such that when a following vehicle approaches 7 m behind the vehicle of interest, both the alarm sound output and the predetermined display are performed, but either one of the operations may be performed.

According to the above exemplary embodiment, the number of frames starts to be counted after a following vehicle is detected to be included in an image shot by the tail camera 10, but the number of frames may start to be counted when a following vehicle approaches the vehicle of interest and reaches a predetermined position. For example, the number of frames may start to be counted when a following vehicle reaches 15 m behind the vehicle of interest and the number of frames may stop being counted when it reaches 10 m behind the vehicle of interest. As described above, it is possible to further reduce the occurrences of a counting error due to a following vehicle detection error when a timing to start counting is delayed than when the counting is started at a far position where a following vehicle is difficult to see.

As described above, according to the present disclosure, it is possible to prevent a delay in the alarm operation since the timing to output the alarm instruction is set based on a result of the counted number of frames including another vehicle, and its processing contents are simple.

What is claimed is:

1. A following vehicle detection and alarm method, the method comprising:
   imaging an area behind a vehicle of interest with a camera at a predetermined frame rate;
   counting the number of frames after another vehicle is shot in a shooting range of the camera until the another vehicle reaches a first predetermined position behind the vehicle of interest;
   outputting an alarm instruction at a first time that varies based on the counted number of frames, for notifying the driver of the vehicle of interest that the another vehicle is approaching; and,
   performing a predetermined alarm operation for the driver when the alarm instruction is output, wherein the predetermined alarm operation is performed at a second time after the alarm instruction is output; and,
   wherein the first time is set such that the predetermined alarm operation is performed when the another vehicle passes a second predetermined position closer to the vehicle of interest than the first predetermined position.

2. The following vehicle detection and alarm method of claim 1,
   wherein the first time is increased as the number of frames decreases.

3. The following vehicle detection and alarm method of claim 1,
   wherein the first time is decreased as the number of frames increases.

4. The following vehicle detection and alarm method of claim 1,
   wherein when the another vehicle is traveling in the next lane to the lane in which the vehicle of interest is traveling and the vehicle of interest changes its traveling lane to the next lane, a predetermined alarm sound is output as the alarm operation.

5. The following vehicle detection and alarm method of claim 1,
   wherein the alarm operation is a predetermined display for notifying that the another vehicle is approaching.

6. The following vehicle detection and alarm method of claim 1,
   wherein a relationship between the number of frames and the first time corresponding to the number of frames is stored in the form of table, and
   the first time is set with reference to the table.

7. The following vehicle detection and alarm method of claim 1,
   wherein a relationship between the number of frames and the first time corresponding to the number of frames is stored in the form of an equation, and
   the first time is set by use of the equation.

* * * * *